United States Patent [19]

Takahashi

[11] 3,866,944
[45] Feb. 18, 1975

[54] LOCKING DEVICE FOR SEAT BELT FOR VEHICLES
[75] Inventor: Kuniyuki Takahashi, Nogoya, Japan
[73] Assignee: Mitsubishi Jidosha Kogyo Kabushiki Kaisha, Tokyo, Japan
[22] Filed: May 3, 1973
[21] Appl. No.: 356,714

[30] Foreign Application Priority Data
May 10, 1972 Japan................................. 47-54443
May 26, 1972 Japan................................. 47-52860
May 26, 1972 Japan................................. 47-52861

[52] U.S. Cl. ......... 280/150 SB, 180/82 C, 180/112, 242/107.4
[51] Int. Cl. ............................................. B60r 21/02
[58] Field of Search ..... 280/150 SB; 180/82 C, 112; 242/107.4

[56] References Cited
UNITED STATES PATENTS 3,240,510   3/1966   Spouge............................ 180/82 C
3,692,328   9/1972   Arlauskas...................... 280/150 SB
3,727,943   4/1973   Augunas........................ 280/150 SB

*Primary Examiner*—Robert R. Song
*Attorney, Agent, or Firm*—Oldham & Oldham Co.

[57] ABSTRACT

A locking device for a seat belt releasably binding the passenger to the seat in a vehicle, in which a seat belt retractor carrying one end portion of the seat belt is disposed in the vehicle door or compartment, and means for automatically locking and unlocking the seat belt retractor in interlocking relation with the closure and opening of the vehicle door are provided so that the passenger can be reliably bound to the seat in response to the closure of the door and released from the state of binding in response to the opening of the door.

5 Claims, 25 Drawing Figures

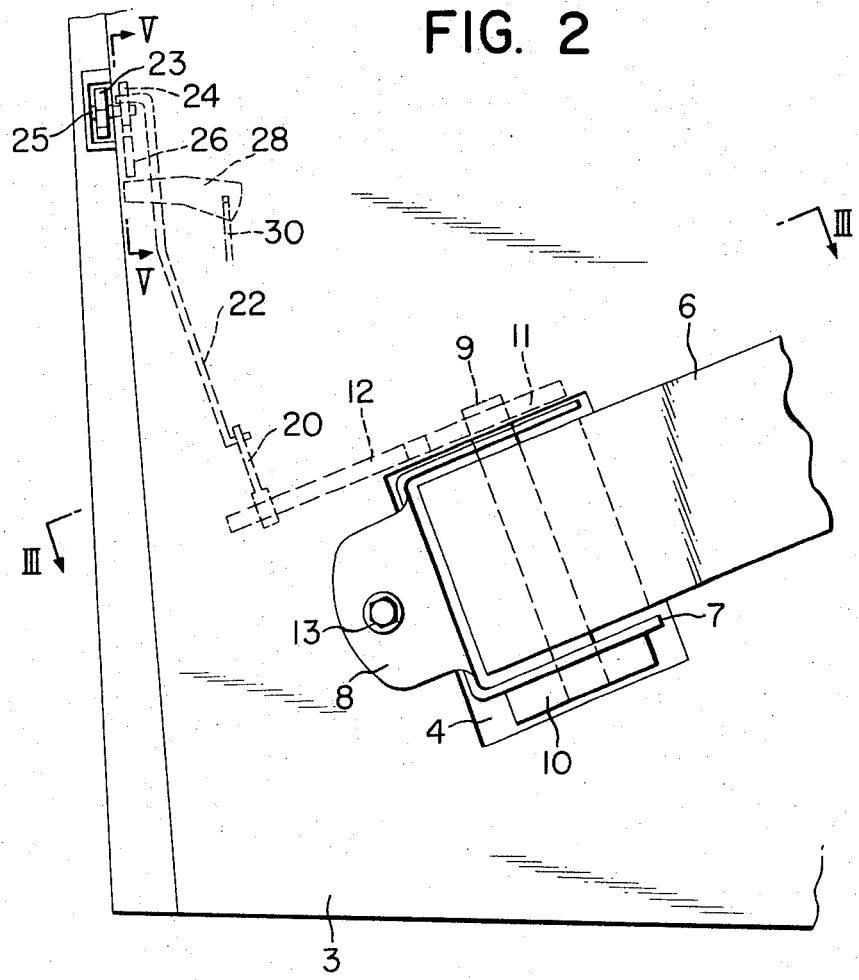
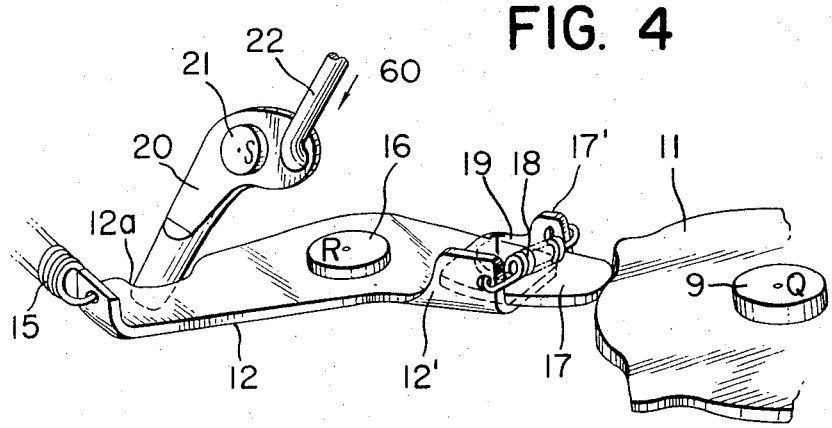

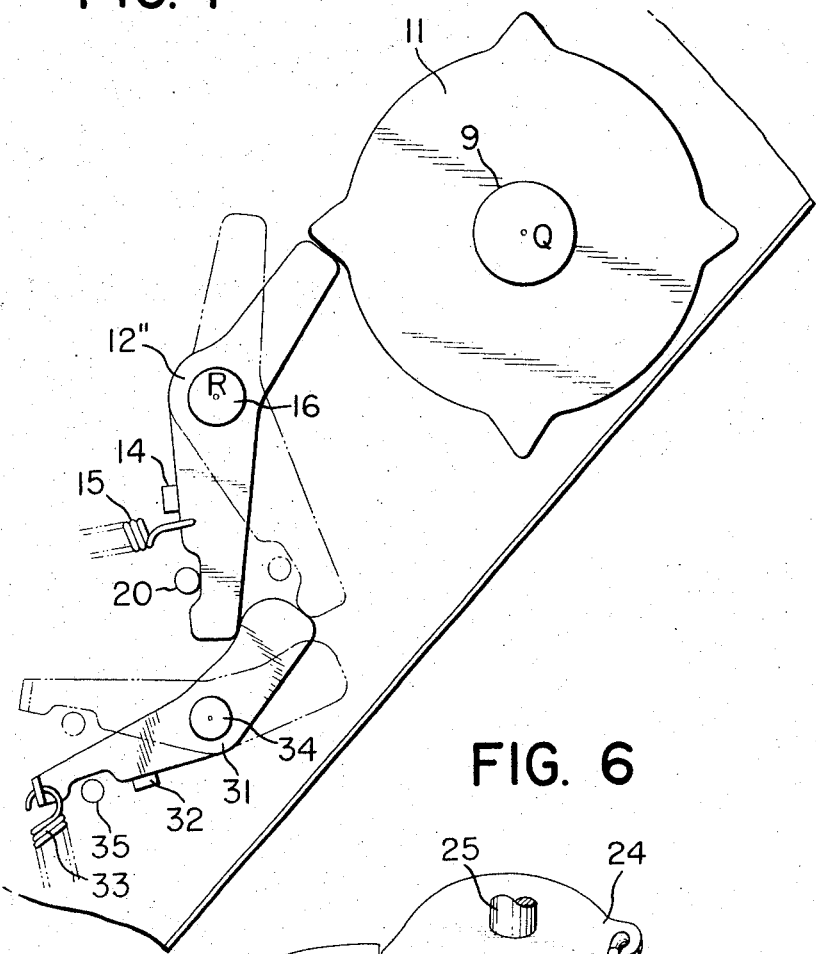
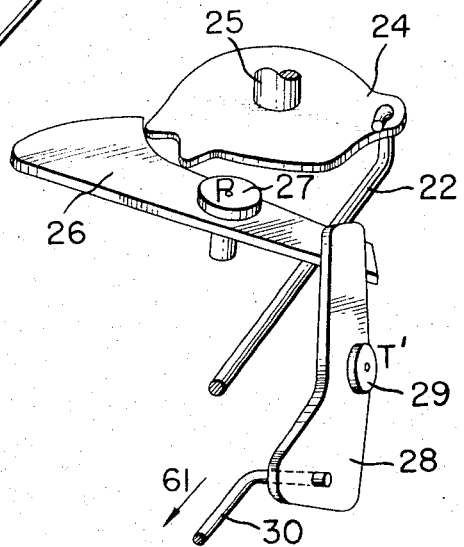

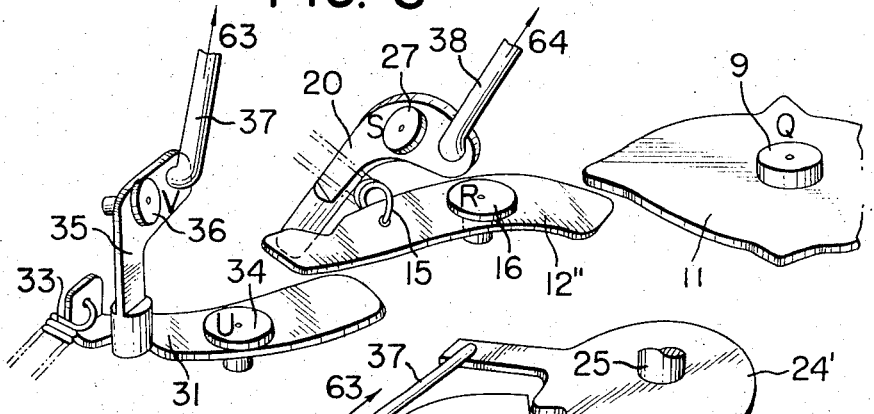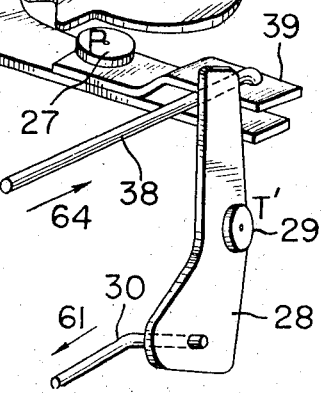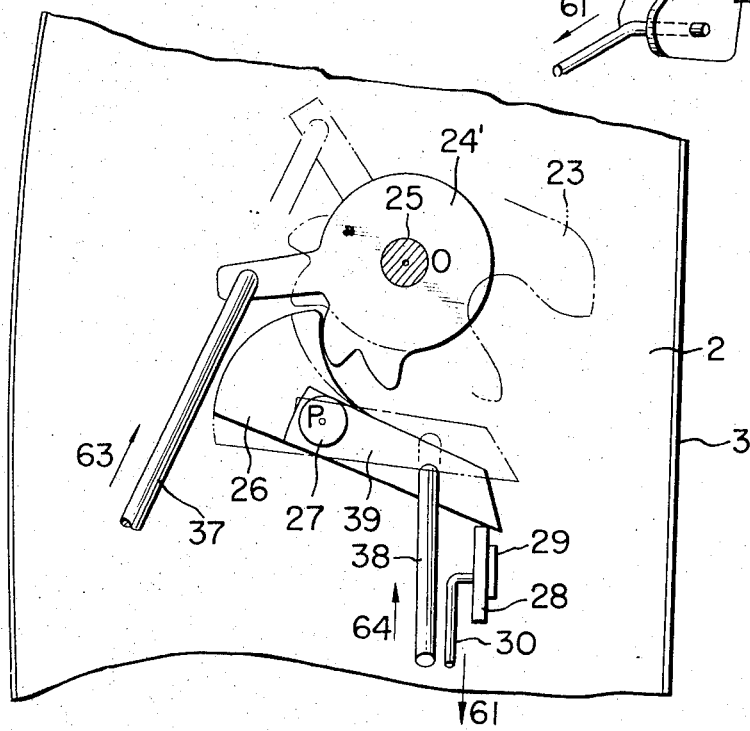

LOCKING DEVICE FOR SEAT BELT FOR VEHICLES

This invention relates to a locking device for a seat belt releasably binding the body of the passenger to the seat in a vehicle.

It is the present tendency toward equipment of a seat belt in a vehicle for enhancing the safety of the passenger even in the event of a collision accident or like trouble. However, in spite of the especial provision of such a seat belt, the passenger drives the vehicle without fastening the seat belt on his body in most cases due to the fact that the wearing of the seat belt is quite cumbersome. It is thus the present status that FMVSS demands a system which ensures the safety of the passenger such that the engine cannot be started unless the seat belt is fastened.

Further, the passenger may also feel the wearing of the seat belt cumbersome due to the binding of his body to the seat. In an attempt to obviate such feeling, a seat belt having an emergency locking retractor has been proposed so that the seat belt can be freely extended and retracted during driving and can be locked against this extending and retracting movement only when a shock is imparted to the vehicle body due to a collision or like accident thereby firmly binding the body of the passenger to the seat by the seat belt. According to such an emergency locking retractor, the retractor is locked in response to impartation of an abrupt shock to the vehicle body so that the seat belt cannot be drawn out any more from the retractor in such a case. A sensor, for example, is provided for detecting deceleration of more than a predetermined value imparted to the vehicle body.

A seat belt retractor has been also proposed in which an inertia reel is employed and is adapted to be locked when the seat belt is drawn out at an excessive rate so as to lock the seat belt against being drawn out any more. These prior art devices have however been defective in that the operation thereof cannot be controlled fully reliably and they are not necessarily convenient for practical use.

With a view to obviate the above-mentioned cumbersome feeling due to the wearing of the seat belt, the present invention contemplates the provision of improved means which can automatically engage and disengage the seat belt on the body of the passenger in response to the closure and opening of the vehicle door unlike the prior art arrangement in which the seat belt is fastened after the passenger sits on the seat.

It is a first object of the present invention to provide a locking device for a seat belt retractor for a vehicle for automatically locking and unlocking the seat belt retractor in interlocking relation with the closure and opening of the door of the vehicle.

The present invention concerns especially with a locking device for a seat belt retractor for a vehicle for automatically locking and unlocking the seat belt retractor in interlocking relation with the operation of door locking means.

In a prior art locking device of this kind which has been proposed hitherto, an automatic locking retractor is disposed inside the door for carrying one end portion of a seat belt having the other end portion thereof fixed to a portion in the vehicle compartment. This prior art locking device has been defective in that the door cannot be opened until the retractor is completely unlocked, and thus, inconvenience has been encountered for the passenger who wants to get off the vehicle. Further, a locking device including a prior art emergency locking retractor connected to a seat belt of the kind above described has been proposed. This locking device has also been defective in that the retractor is automatically locked and the door cannot be opened unless the door is opened slowly and the device is devoid of reliability of operation and is quite expensive.

In accordance with one aspect of the present invention, there is provided a locking device for a seat belt releasably binding the body of the passenger to the seat in a vehicle comprising a seat belt retractor disposed in the door and having locking means, door locking means mounted in the door, and means operative in interlocking relation with the disengagement and engagement of said door locking means for disengaging and engaging said seat belt retractor locking means.

The locking device having the features above described is advantageous in that the seat belt retractor carrying one end portion of the seat belt fixed at the other end portion thereof to a portion in the vehicle compartment can be manufactured at low cost and can be automatically and reliably locked to bind the passenger sitting on the seat in spite of a simple construction, while when the passenger wants to get off the vehicle, the retractor can be automatically unlocked to release the seat belt binding the passenger to the seat.

In accordance with another aspect of the present invention, there is provided a locking device for a seat belt releasably binding the body of the passenger to the seat in a vehicle comprising a seat belt retractor mounted to a portion in the vehicle compartment and having locking means, means for detecting the opening and closure of the door, and means operative in interlocking relation with said detecting means for disengaging and engaging said seat belt retractor locking means in response to the opening and closure of said door.

In the locking device having the features above described, the seat belt retractor locking means is actuated in the closed position of the door so that the passenger can be automatically and reliably bound to the seat by the seat belt for ensuring the safety of the passenger, and the seat belt retractor locking means is rendered inoperative in response to the opening of the door without especially requiring any other manipulation so that the passenger can easily get on and off the vehicle. Therefore, this locking device is advantageous in that the cumbersome engagement and disengagement of the seat belt during getting on and off of the passenger can be entirely eliminated and the passenger can be reliably bound to the seat when he sits on the seat.

A second object of the present invention is to provide a novel system for locking the seat belt in response to the detection of a shock imparted to the vehicle body due to, for example, collision.

In accordance with another aspect of the present invention, there is provided a locking device for a seat belt releasably binding the body of the passenger to the seat in a vehicle comprising a seat belt retractor mounted to a portion in the vehicle compartment and having locking means, means including a solenoid for normally maintaining said seat belt retractor locking means in a disengaged position and biasing said seat belt retractor locking means to an engaged position in response to impartation of deceleration of more than a predetermined value to the vehicle, means for detecting the opening and closure of the door, and means operative in interlocking relation with said detecting means for maintaining said seat belt retractor locking means in the disengaged position in response to the opening of the door and placing said seat belt retractor locking means in a position to be readily biased to the engaged position in response to the closure of said door.

Thus, the passenger can freely move his body not only when the door is opened but also when he wears the seat belt after closing the door. On the other hand, when a large shock is imparted to the vehicle body due to, for example, collision, the means including the solenoid is actuated to lock the seat belt retractor thereby automatically and reliably binding the passenger to the seat by the seat belt for ensuring the safety of the passenger. Further, the passenger who is bound by the seat belt can easily get off the vehicle by merely opening the door without especially requiring any other manipulation due to the fact that the seat belt is unlocked in response to the opening of the door. Therefore, this locking device is advantageous in that the cumbersome engagement and disengagement of the seat belt during getting on and off of the passenger can be entirely eliminated although he wears the seat belt on his body in the vehicle.

A third object of the present invention is to provide a locking device for a seat belt retractor for a vehicle in which an electrical operation for energizing a solenoid in response to the detection of a shock by a sensor and a mechanical operation for actuating a door locking means are combined so that, only when the engine is in operation and the ignition switch is "on", the solenoid can be energized to unlock the retractor, while when the engine is not in operation, the retractor can be unlocked in response to the opening of the door.

Prior art locking devices comprising an emergency locking retractor adapted to be applied to a passive belt include a type in which a sensor is provided for detecting the acceleration of gravity G of the vehicle body for locking the retractor depending on the value of G. However, the sensor for detecting G must be electrically connected to the retractor, resulting in troubles as described below. For example, in a system in which the flow of current is interrupted in response to a shock and a solenoid is energized for locking the retractor, the solenoid must be directly connected to the battery since the retractor cannot be unlocked unless current is continuously supplied thereto, and the door cannot be opened when the battery is damaged or the wiring is disconnected. Further, the battery tends to be completely consumed since current is continuously supplied from the battery even during parking. In another system in which current is supplied to a solenoid in response to a shock and the solenoid is energized for locking the retractor, the retractor would not be locked when the wiring is disconnected or the battery is damaged due to collision. From the viewpoint of safety, however, the former system is perferable.

In accordance with another aspect of the present invention, there is provided a locking device for a seat belt releasably binding the body of the passenger to the seat in a vehicle comprising a seat belt retractor for releasably holding one end portion of said seat belt, said seat belt retractor including a shaft having a return spring thereon for normally biasing said seat belt in the retracting direction, an automatic locking wheel having a plurality of tooth portions and mounted firmly on said shaft, a locking lever pivoted at substantially the central portion thereof to the door by a pin and having an engaging end portion engageable with said tooth portions of said automatic locking wheel, a spring associated with said locking lever for normally biasing said engaging end portion of said locking lever toward said automatic locking wheel, a solenoid including a solenoid pin having a hook-shaped end portion engaging with a slot bored in the other end portion of said locking lever, a release lever engageable at one end portion thereof with the other end portion of said locking lever, a ratchet wheel rotatable in unitary relation with a locking wheel engageable with the striker mounted to the vehicle body, and a rod connecting the other end portion of said release lever to a portion of said ratchet wheel.

The locking device having the features above described obviates all the defects of the prior art locking device having the emergency locking retractor.

The above and other objects, features and advantages of the present invention will be apparent from the following detailed description taken in conjunction with the accompanying drawings, in which:

FIG. 2 is a schematic enlarged view showing the arrangement of parts of the first embodiment shown in FIG. 1 when viewed in a direction of the arrow II in FIG. 1;

FIG. 4 is a schematic perspective view of the parts of the first embodiment shown in FIG. 3;

FIG. 6 is a schematic perspective of the parts of the first embodiment shown in FIG. 5;

FIG. 7 is a schematic view similar to FIG. 3 but showing the arrangement of parts of a second embodiment of the present invention;

FIG. 8 is a schematic perspective view of the parts of the second embodiment shown in FIG. 7;

FIG. 9 is a schematic view similar to FIG. 5 but showing the arrangement of parts of the second embodiment;

FIG. 10 is a schematic perspective view of the parts of the second embodiment shown in FIG. 9;

Figure 1:
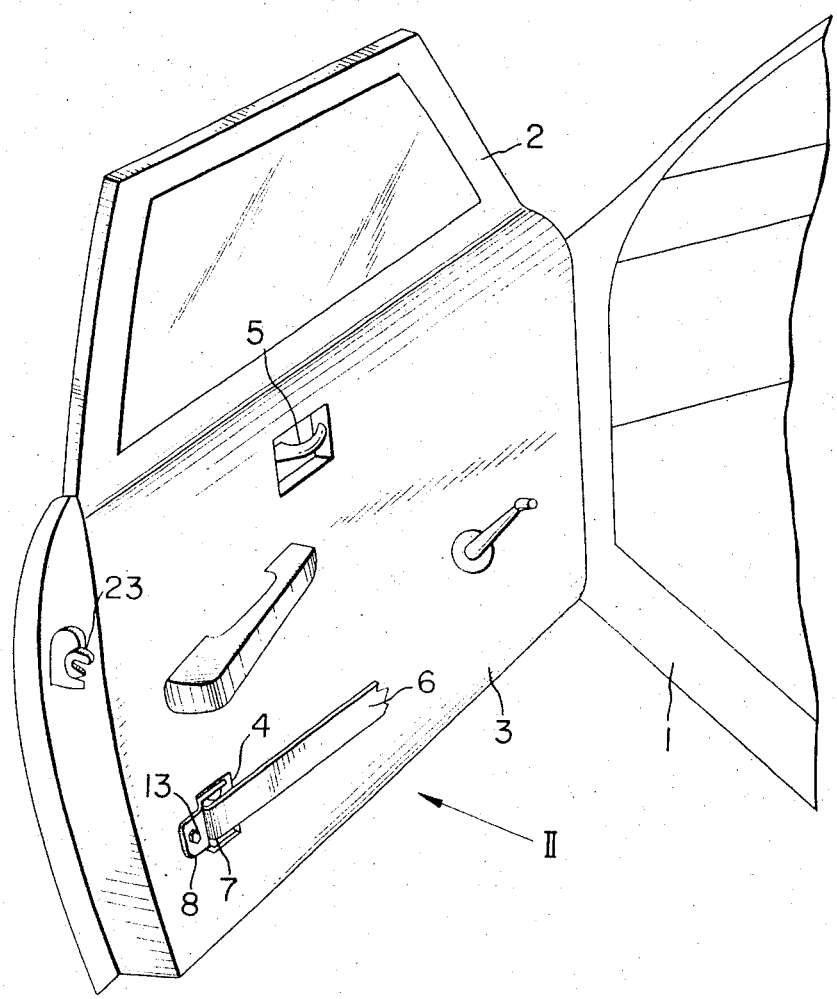
FIG. 1 is a schematic perspective view of a vehicle door showing the mounting position of a first embodiment of the locking device according to the present invention.

Referring to FIGS. 1 to 6 showing a first embodiment of the present invention, a seat belt 6 is anchored at one end thereof to a stationary part in the body 1 of a vehicle, and the other end portion of the seat belt 6 is releasably carried by a seat belt retractor 7. The retractor 7 is provided with a shaft 9 and a retracting spring 10 and is housed within a cut-out portion 4 of an inner panel 3 of the door 2 hinged to the vehicle body 1. The retractor 7 is fixed at its tongue 8 to the inner side of the door 2 by a bolt 13. An automatic locking wheel 11 is fixedly mounted on the shaft 9 for unitary rotation with the shaft 9 around the axis Q of the shaft 9, and a plurality of spaced tooth portions 11a are formed on the outer periphery of the automatic locking wheel 11. A locking lever 12 is pivoted to the door 2 by a pin 16 so as to make pivotal movement around the axis R of the pin 16. This locking lever 12 is normally maintained in a position as shown by the solid line in FIG. 3 by a return spring 15, which is anchored at one end thereof to the door 2 and at the other end thereof to the other end of the locking lever 12, and by a stopper 14 secured to the door 2. A one-way lever 17 is pivoted by a pin 19 to one end portion of the locking lever 12 so as to be engageable with the tooth portion 11a of the automatic locking wheel 11. This one-way lever 17 is normally maintained in a position as shown by the solid line in FIG. 3 by a stopper 12' formed on one side of the said end portion of the locking lever 12 and by a return spring 18 anchored at one end thereof to the stopper 12' and at the other end thereof to a projection 17' formed on the other side of the said end portion of the locking lever 12 opposite to the stopper 12'. This one-way lever 17 can make pivotal movement on the locking lever 12 in a counter-clockwise direction only in FIG. 3 around the axis T of the pin 19.

Figure 3:
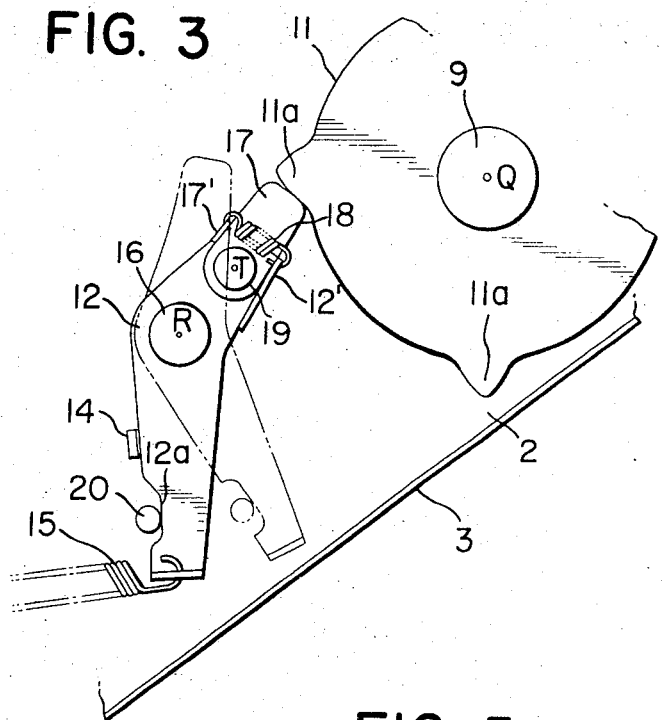
FIG. 3 is a schematic view showing the arrangement of parts of the first embodiment when viewed along the line III—III in FIG. 2.
Figure 5:
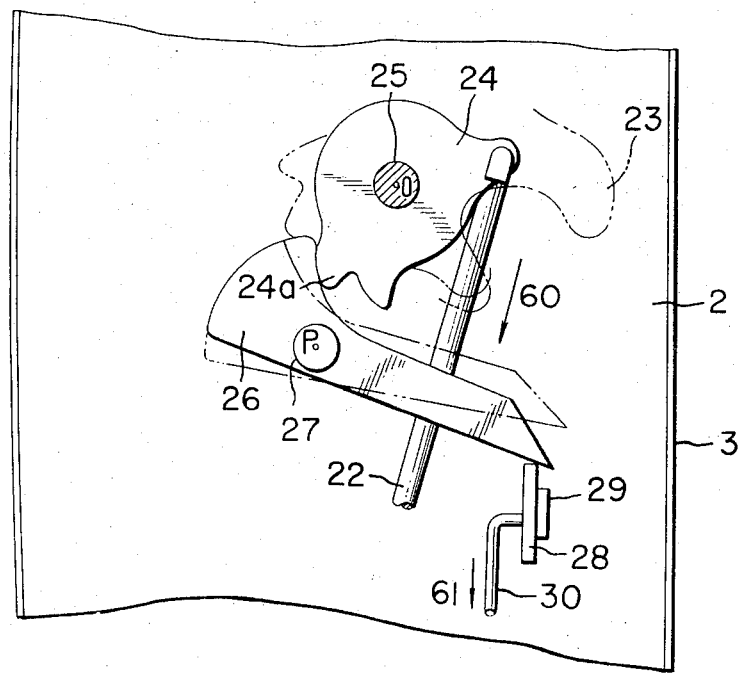
FIG. 5 is an enlarged schematic view showing the arrangement of parts of the first embodiment when viewed along the line V—V in FIG. 2.
Figure 11:
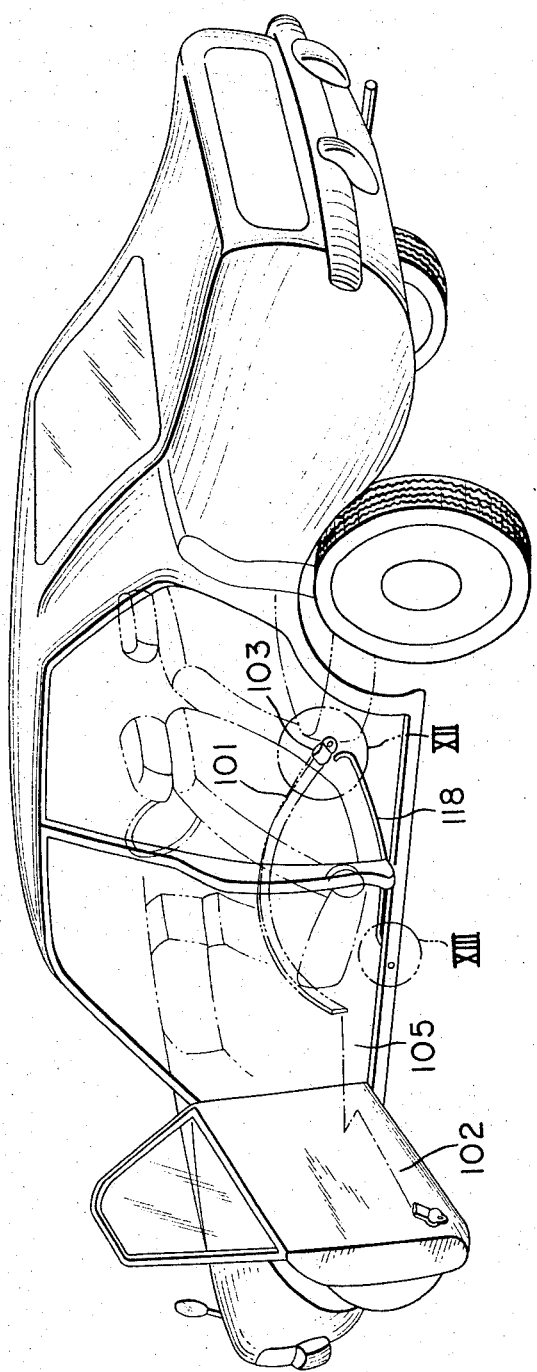
FIG. 11 is a schematic perspective view of a vehicle equipped with a third embodiment of the present invention.

A release lever 20 is pivoted to the door 2 by a pin 21 so as to make pivotal movement around the axis S of the pin 21. One end portion of this release lever 20 engages with a groove or recess portion 12a formed at the other end portion of the locking lever 12 as shown in FIGS. 3 and 4. The other end portion of the release lever 20 is connected to a ratchet wheel 24 by a rod 22. This ratchet wheel 24 is pivoted by a shaft 25 to the open end portion of the door 2 together with a latch wheel 23 engageable with a striker (not shown) fixed to the vehicle body 1 so that the ratchet wheel 24 can rotate around the axis O of the shaft 25 together with the latch wheel 23. The ratchet wheel 24 is maintained in a position as shown by the solid line in FIG. 5 by a spring (not shown) when the door 2 is opened. A ratchet lever 26 engageable at one end portion thereof with the ratchet wheel 24 is pivotally secured by a pin 27 to the door 2 so as to make pivotal movement around the axis P of the pin 27. This ratchet lever 26 is normally maintained in a position as shown by the solid line in FIG. 5 by a spring (not shown). An open lever 28 is pivotally secured by a pin 29 to the door 2 so as to make pivotal movement around the axis T' of the pin 29. One end portion of this open lever 28 engages with the corresponding end portion of the ratchet lever 26 as shown in FIGS. 5 and 6. The other end portion of the open lever 28 is connected to an inside door handle 5 mounted to the door 2 or to an outside door handle (not shown) by the rod 30.

In operation, in response to the closure of the door 2, the latch wheel 23 rotates clockwise around the axis O in FIG. 5 so as to engage with the striker. Therefore, the ratchet wheel 24 rotates in the same direction and the ratchet lever 26 swings counter-clockwise around the axis P by being urged by a tooth portion 24a of the ratchet wheel 24. When the ratchet wheel 24 under rotation reaches a position as shown by the two-dot chain line in FIG. 5, the ratchet lever 26 is returned to the position shown by the solid line in FIG. 5 by the action of the spring. In the meantime, due to the fact that the rod 22 connected at one end thereof to the ratchet wheel 24 moves in a direction as shown by the arrow 60 in FIG. 5, the lever 20 connected to the other end of the rod 22 swings clockwise around the axis S in FIG. 4 with the result that the locking lever 12 engaged at its recess portion 12a by the release lever 20 is urged from the position shown by the two-dot chain line to the position shown by the solid line in FIG. 3 to be maintained in such a position. Due to the fact that, in such a state, the one-way lever 17 mounted on the end portion of the locking lever 12 adjacent to the automatic locking wheel 11 is brought into engagement with one of the tooth portions 11a of the automatic locking wheel 11, the automatic locking wheel 11 cannot rotate counter-clockwise in FIG. 3, and therefore, the seat belt 6 cannot be drawn out from the retractor 7.

On the other hand, when the seat belt 6 is in a slackened state, the wheel 11 is rotated clockwise in FIG. 3 by the force of the retracting spring 10 which biases normally the seat belt 6 in the retracting direction. In this case, the successive tooth portions 11a of the wheel 11 are brought into engagement with the one-way lever 17. However, due to the fact that the force of the return spring 18 for the one-way lever 17 is relatively weak, the one-way lever 17 is caused to swing counter-clockwise in FIG. 3, and thus, the automatic locking wheel 11 continues to be rotated clockwise by the action of the retracting spring 10 until the seat belt 6 is completely free from the slackened state.

In response to the manipulation of the inside door handle 5 mounted to the door 2 or of the outside door handle (not shown) for the purpose of opening the door 2, the rod 30 is urged in a direction as shown by the arrow 61 in FIG. 6 and the open lever 28 is caused to swing clockwise around the axis T' in FIG. 6. As a result, the ratchet lever 26 engaged by this open lever 28 is caused to swing counter-clockwise around the axis P in FIG. 5. When the ratchet lever 26 is swung to a position as shown by the two-dot chain line in FIG. 5, the ratchet lever 26 is disengaged from the ratchet wheel 24. Thus, the ratchet wheel 24 is returned to the position shown by the solid line in FIG. 5 by the force of the return springs associated with the ratchet wheel 24 and latch wheel 23, and the rod 22 connected to the ratchet wheel 24 is urged in a direction opposite to the direction of the arrow 60 in FIG. 5 to take the state shown by the solid line in FIG. 5. Therefore, the lever 20 connected to the rod 22 is caused to swing counter-clockwise around the axis S in FIG. 4. Further, the locking lever 12 engaged by the release lever 20 swings counter-clockwise around the axis R against the force of the return spring 15 in FIG. 3 and this locking lever 12 is disengaged from the tooth portion 11a of the automatic locking wheel 11. In such a state, the automatic locking wheel 11 is capable of rotating freely in both the clockwise and counter-clockwise directions and the seat belt 6 can be freely supplied from and taken up on the retractor 7.

The latch wheel 23 rotatable in unitary relation with the ratchet wheel 24 returns to the position shown by the two-dot chain line in FIG. 5 and this locking wheel 23 is disengaged from the striker so that the door 2 can be freely opened. After the door 2 is opened and the manipulation of the inside door handle 5 or outside door handle is ceased, the rod 30 is urged in a direction opposite to the direction of the arrow 61 shown in FIG. 6 and the open lever 28 connected to this rod 30 is caused to rotate counter-clockwise around the axis T' in FIG. 6. As a result, the ratchet lever 26 engaged by this lever 28 rotates clockwise around the axis P in FIG. 6 to return to the position shown by the solid line in FIG. 5.

It will be understood from the above description of the first embodiment of the present invention that the retractor 7 is not capable of rotation in the belt supplying direction and is only capable of rotation in the belt take-up or retracting direction for eliminating any slackening of the seat belt 6 in the state in which the door 2 is closed. Thus, the seat belt 6 is automatically locked for reliably binding the body of the passenger to the seat in the vehicle. On the other hand, in response to the actuation of the locking means for the inside door handle 5 or outside door handle for the purpose of opening the door 2 as the passenger wishes to get off the vehicle, the seat belt 6 is released from the locked state and the retractor 7 is now capable of free rotation so that the seat belt 6 can be drawn out with the opening movement of the door 2 thereby facilitating getting off and on of the passenger. Further, due to the fact that the one-way lever 17 is engaged with and disengaged from the tooth portion 11a of the automatic locking wheel 11 depending on the rotation of the ratchet wheel 24 responsive to the manipulation of the door handle, this seat belt locking device is advantageous in that it is simple in construction and inexpensive and can be easily mounted in the door 2.

FIGS. 7 to 10 show a second embodiment of the present invention. This second embodiment is actually a modification of the first embodiment described with reference to FIGS. 1 to 6. Referring to FIGS. 7 to 10, a locking lever 12'' which replaces the lever 12 shown in FIG. 3 is engageable at one end portion thereof with the tooth portions 11a of the automatic locking wheel 11. This locking lever 12'' is similarly pivoted by a pin 16 to the door 2 so as to make pivotal movement around the axis R of the pin 16. This locking lever 12'' is normally maintained in a position as shown by the solid line in FIG. 7 by the stopper 14 and by the return spring 15 which is anchored at one end thereof to the door 2 and at the other end thereof to a portion adjacent to the other end of the locking lever 12''. The locking lever 12'' is similarly provided with a groove or recess portion which is engaged by one end portion of the release lever 20 as shown in FIGS. 7 and 8. The other end portion of the lever 20 is connected to a lever 39 by a rod 38. A second release lever 31 is pivoted by a pin 34 to the door 2 so as to make pivotal movement around the axis U of the pin 34 for disengageably engaging at one end portion thereof with the recessed end portion of the locking lever 12''. This release lever 31 is normally maintained in a position shown by the solid line in FIG. 7 by a return spring 33, which is anchored at one end thereof to the other end portion of the lever 31 and at the other end thereof to the door 2, and by a stopper 32 secured to the door 2. The release lever 31 is provided with a groove or recess portion adjacent to the other end thereof, and one end portion of a lever 35 engages this recess portion of the lever 31 as shown in FIGS. 7 and 8. This lever 35 is pivoted by a pin 36 to the door 2 so as to make pivotal movement around the axis V of the pin 36, and the other end portion of the lever 35 is connected to a ratchet wheel 24' by a rod 37. The relation between the rod 37 and the ratchet wheel 24' differs from the relation between the rod 22 and the ratchet wheel 24 in the first embodiment, but the structure and arrangement of other elements are similar to those of the first embodiment.

The lever 39 connected to the rod 38 is pivoted to the door 2 by the pin 27 together with the ratchet lever 26 and is arranged to overlie the lever 26 as shown in FIG. 9 and 10 so that it can rotate independently of the lever 26 around the axis P of the pin 27. The structure and arrangement of the lever 26 and open lever 28 are similar to those of the first embodiment except that the lever 39 is engaged by the open lever 28 in a manner as shown in FIG. 10.

In operation, in response to the closure of the door 2, the locking wheel 23 and ratchet wheel 24' rotate clockwise around the axis O in FIG. 9 to be biased to a position as shown by the two-dot chain line in FIG.

9 as in the case of the first embodiment. The ratchet lever 26 is biased in a manner similar to that in the first embodiment to be returned to a position as shown by the solid line in FIG. 9. In this case, however, the lever 39 is not actuated due to the fact that it is adapted for rotation independently of the ratchet lever 26. Simultaneously with the above operation, the rod 37 connected at one end thereof to the ratchet wheel 24' is moved in a direction as shown by the arrow 63 in FIG. 9 with the result that the lever 35 connected to the other end of this rod 37 is caused to swing counter-clockwise around the axis V in FIG. 8 and the release lever 31 engaging at its recess portion with the lever 35 is maintained in a position as shown by the two-dot chain line in FIG. 7. Due to the fact that one end portion of the locking lever 12" is brought into engagement with one of the tooth portions of the automatic locking wheel 11 by the force of the return spring 15 in such a state, the automatic locking wheel 11 is not capable of rotation in the counter-clockwise direction in FIG. 7, and therefore, the seat belt 6 cannot be drawn out.

On the other hand, when the seat belt 6 is in a slackened state, the wheel 11 is rotated clockwise in FIG. 7 by the force of the retracting spring 10 which biases normally the seat belt 6 in the retracting direction. In this case, the successive tooth portions of the wheel 11 are brought into engagement with the engaging end portion of the locking lever 12". However, due to the fact that the force of the return spring 15 associated with the lever 12" is relatively weak, the lever 12" is caused to swing counterclockwise slightly and then return to the original position. Thus, the automatic locking wheel 11 continues to be rotated by the action of the return spring 15 until the seat belt 6 is completely free from the slackened state.

In response to the manipulation of the inside door handle 5 or outside door handle (not shown) for the purpose of opening the door 2, the rod 30 is urged in a direction as shown by the arrow 61 in FIG. 10 and the open lever 28 is caused to swing clockwise around the axis T' in FIG. 10. As a result, the ratchet lever 26 and lever 39 engaged by the open lever 28 are caused to swing counter-clockwise around the axis P in FIG. 9. When the ratchet lever 26 and lever 39 are swung to a position as shown by the two-dot chain line in FIG. 9, the lever 26 is disengaged from the ratchet wheel 24'. Thus, the ratchet wheel 24' is returned to the position shown by the solid line in FIG. 9 by the force of the return springs associated with the ratchet wheel 24' and locking wheel 23, and the locking wheel 23 is disengaged from the striker so that the door 2 can be freely opened.

Further, the rod 37 connected to the ratchet wheel 24' is urged in a direction opposite to the direction of the arrow 63 in FIG. 9 to take the state shown by the solid line in FIG. 9. Therefore, the lever 35 connected to the rod 37 is rotated clockwise around the axis V in FIG. 8. As a result, the release lever 31 engaged by the lever 35 is caused to swing counter-clockwise around the axis U in FIG. 7 by the action of the return spring 33 to take the position shown by the solid line in FIG. 7.

In the meantime, due to the temporary rotation of the lever 39, the rod 38 connected to this lever 39 is temporarily urged in a direction as shown by the arrow 64 in FIGS. 9 and 10. As a result, the lever 20 connected to the rod 38 is caused to swing counter-clockwise around the axis S in FIG. 8, and the locking lever 12" engaged by this lever 20 is caused to swing counter-clockwise around the axis R in FIG. 7 to take the position shown by the two-dot chain line in FIG. 7. Due to the counter-clockwise swinging movement of both the locking lever 12" and the release lever 31 in FIG. 7, these levers 12" and 31 are brought into contact with each other during such swinging movement, and the release lever 12" urges the release lever 31 to swing temporarily clockwise against the force of the return spring 33 so that the locking lever 12" overrides the engaging end portion of the release lever 31. As a result, the release lever 31 acts to maintain the locking lever 12" in a state in which the engaging end portion of the locking lever 12" is disengaged from the tooth portion of the automatic locking wheel 11 thereby permitting free rotation of the automatic locking wheel 11 in both the clockwise and counter-clockwise direction. Thus, the seat belt 6 can be freely supplied from and taken up on the retractor 7.

Then, when the door 2 is closed again, the same operation as that described hereinbefore takes place and the release lever 31 is caused to swing clockwise around the axis U in FIG. 7 to be maintained in the position shown by the two-dot chain line. As a result, the locking lever 31 is disengaged from the release lever 12" and the latter lever 12" is caused to swing clockwise around the axis R by the force of the return spring 15 to take the position shown by the solid line in FIG. 7.

It will be understood from the above description that the second embodiment of the present invention exhibits the entirely same effects as those of the first embodiment.

Referring to FIGS. 11 to 14 showing a third embodiment of the present invention, a seat belt 101 is anchored at one end thereof to the door 102 of a vehicle, and the other end portion of the seat belt 101 is taken up on a shaft 104 of a seat belt retractor 103 which is mounted to a portion of the body 105 of the vehicle by bolts 106 and nuts 107. A locking wheel 108 having a plurality of teeth 109 is fixedly mounted on the shaft 104 of the retractor 103 having the other end portion of the seat belt 101 wound thereround. A lever 110 having an engaging end portion 110a engageable with the teeth 109 of the locking wheel 108 is pivoted by a pin 112 to a plate 111 welded or otherwise fixed to the retractor 103. The plate 111 is provided with a stopper 113 for limiting downward swinging movement of the lever 110. A coil spring 114 is anchored at one end thereof to the other end portion 110b of the lever 110 for normally biasing the lever 110 counter-clockwise. A cable end 115 is pivoted at its lower end portion to the lever 110 by a pin 116, and one end of an inner cable 117 is secured to the upper end of the cable end 115. The inner cable 117 extends through a hollow tubular outer cable 118 to be secured at the other end thereof to another cable end 119. The cable end 119 is pivoted loosely to a bell crank 121 by a pin 120, and this bell crank 121 is pivoted to a bracket 123 by a pin 122. A rod 125 having a central stopper 124 is pivoted loosely to one end portion 121a of the bell crank 121 by a pin 126. The bracket 123 is welded or otherwise fixed to a guide member 127 which is welded or otherwise fixed to a side sill 128. The guide member 127 is provided with a hub portion which extends through an opening 129 bored in the side sill 128, and the rod 125 is slidably received in the hub portion of the guide member 127. A coil spring 130 is anchored at one end thereof to the other end portion 121b of the bell crank 121 for normally biasing the bell crank 121 counter-clockwise. The force of the coil spring 130 biasing the bell crank 121 in selected to be greater than the force of the coil spring 114 biasing the lever 110.

In operation, in response to the closure of the door 102, the seat belt 101 is drawn into the seat belt retractor 103 by the action of a return spring (not shown) in the retractor 103 so that the seat belt 101 binds the body of the passenger to the seat. Due to the fact that the rod 125 is urged from the position shown by the solid line to the position shown by the two-dot chain line in FIGS. 13 and 14 with the closure of the door 102, the bell crank 121 is caused to swing to the position shown by the two-dot chain line in FIG. 14 against the force of the coil spring 130 thereby urging the inner cable 117 downward, and the cable end 115 is urged to the position shown by the solid line in FIG. 12. The cable end 115 cooperates with the spring 114 to cause swinging movement of the lever 110 to the position shown by the solid line in FIG. 12 with the result that the engaging end portion 110a of the lever 110 engages with one of the teeth 109 of the locking wheel 108 thereby locking the locking wheel 108 against rotation. Therefore, the seat belt 101 is locked in that state and the passenger is bound to the seat by the seat belt 101.

Figure 12:
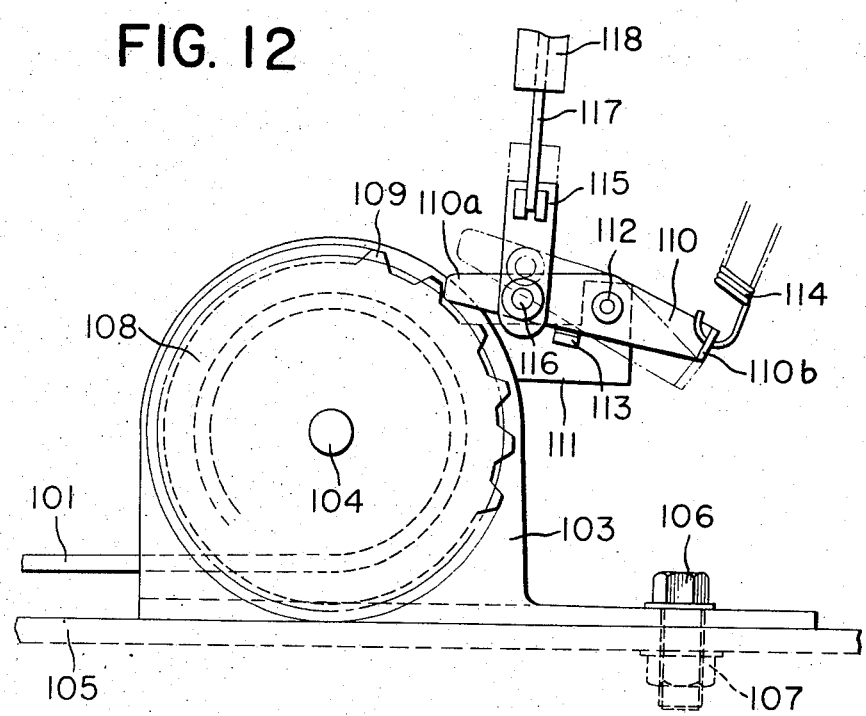
FIG. 12 is an enlarged schematic view showing the arrangement of parts of the third embodiment at the portion XII in FIG. 11.
Figure 13:
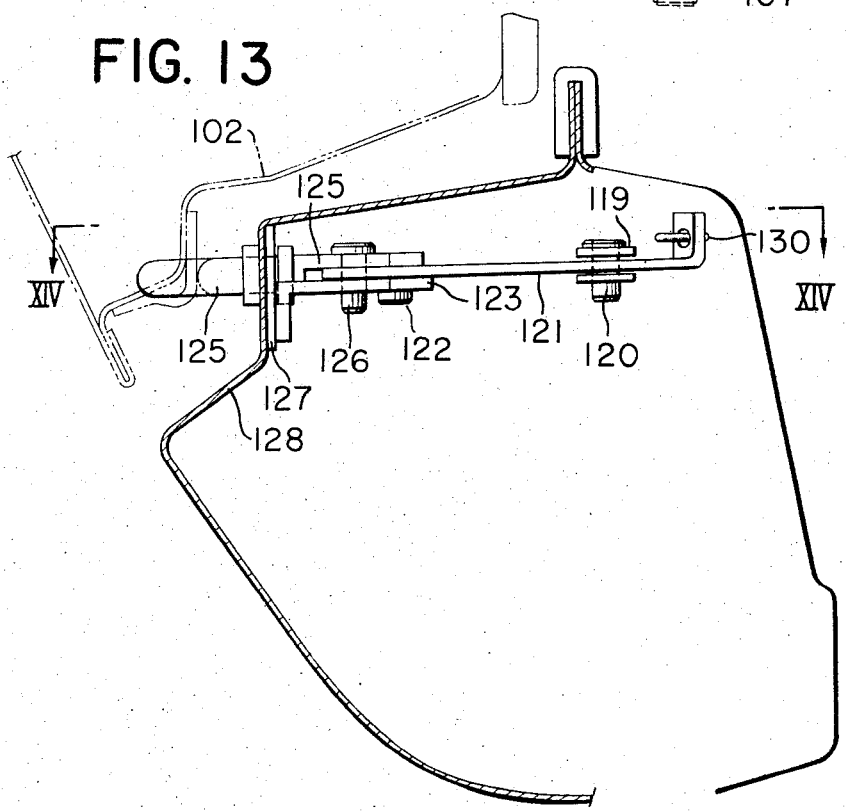
FIG. 13 is an enlarged schematic view showing the arrangement of parts of the third embodiment at the portion XIII in FIG. 11.
Figure 14:
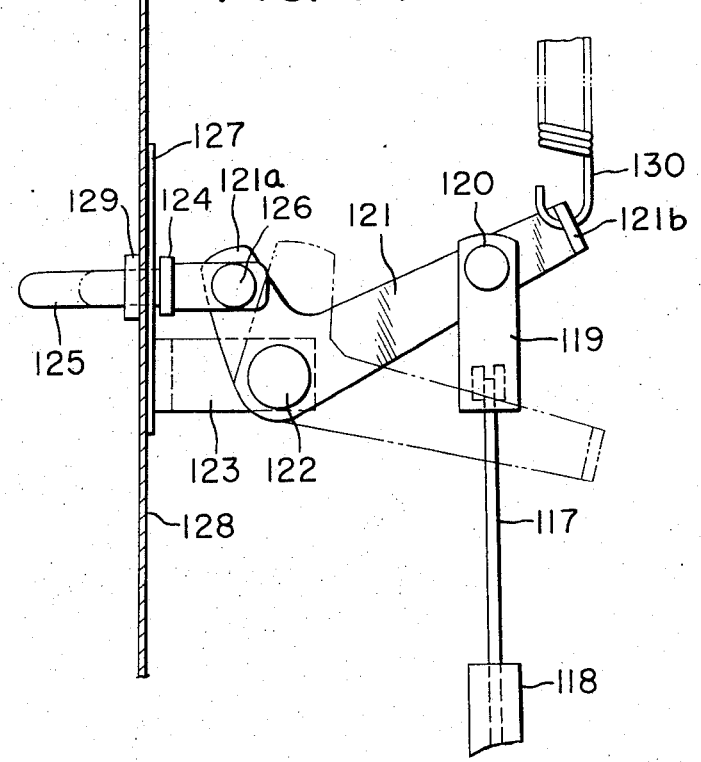
FIG. 14 is a schematic view showing the arrangement of the parts of the third embodiment when viewed along the line XIV—XIV in FIG. 13.

When the door 102 is opened, the bell crank 121 and rod 125 are restored to the position shown by the solid line in FIG. 14 by the force of the spring 130, and the inner cable 117 connected to the cable end 119 acts to pull the cable end 115 to the position shown by two-dot chain line in FIG. 12. As a result, the lever 110 is caused to swing to the position shown by the two-dot chain line in FIG. 12 thereby releasing the engagement between the tooth 109 of the locking wheel 108 and the engaging end portion 110a of the lever 110. Thus, the locking wheel 108 is now freely rotatable and the seat belt 101 fixed at one end thereof to the door 102 is drawn out from the retractor 103 with the opening of the door 102 so that the passenger is freed from the binding to the seat and can get off the vehicle freely or another passenger can get on the vehicle.

It will thus be seen that the passenger sitting on the seat by being bound by the seat belt 101 is freed from the binding by the seat belt 101 and can get off the vehicle when the door 102 is merely opened, and that the seat belt 101 binds the passenger to the seat when the passenger sitting on the seat merely closes the door 102. This arrangement is advantageous in that there is no need for the passenger to manually apply and detach the seat belt 101 each time he gets on and off the vehicle and the body of the passenger can be reliably bound by the seat belt 101 automatically or such binding can be automatically released.

Figure 15:
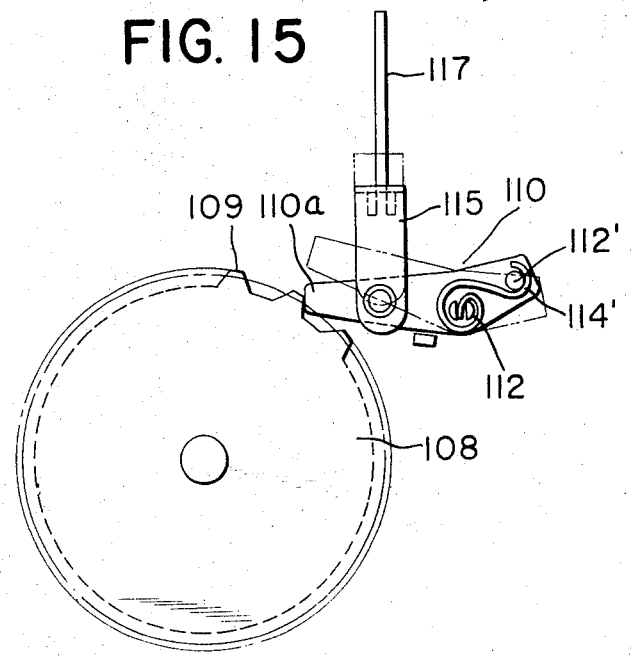
FIG. 15 is a schematic view similar to FIG. 12 but showing the arrangement of parts of a fourth embodiment of the present invention.
Figure 16:
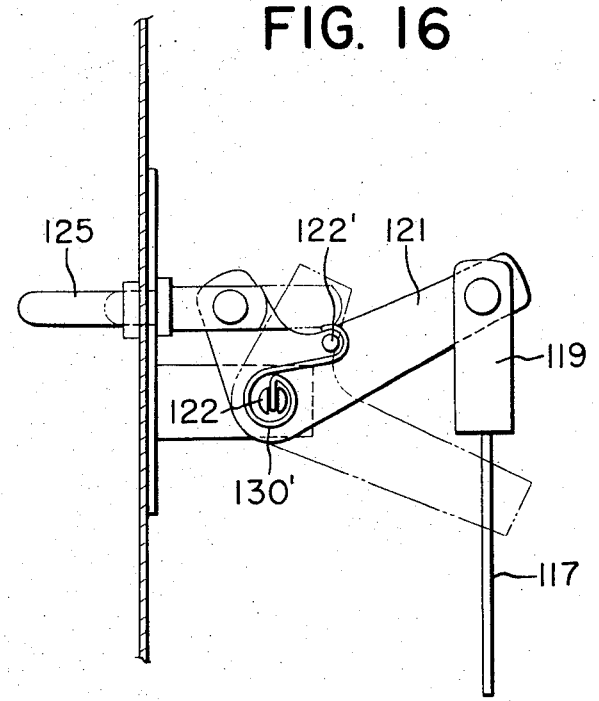
FIG. 16 is a schematic view similar to FIG. 13 but showing the arrangement of parts of the fourth embodiment.

A fourth embodiment of the present invention shown in FIGS. 15 and 16 is a modification of the third embodiment shown in FIGS. 11 to 14. Referring to FIGS. 15 and 16, spiral springs 114' and 130' are employed in lieu of the coil springs 114 and 130 respectively employed in the third embodiment. The spiral spring 114' engages at opposite ends thereof with a pair of pins 112 and 112' respectively fixed to the lever 110 so as to normally bias the lever 110 counter-clockwise. The spiral spring 130' engages at opposite ends thereof with a pair of pins 122 and 122' respectively fixed to the bell crank 121 so as to normally bias the bell crank 121 counter-clockwise. Other components have a structure and arrangement which are the same as those in the third embodiment.

Figure 17:
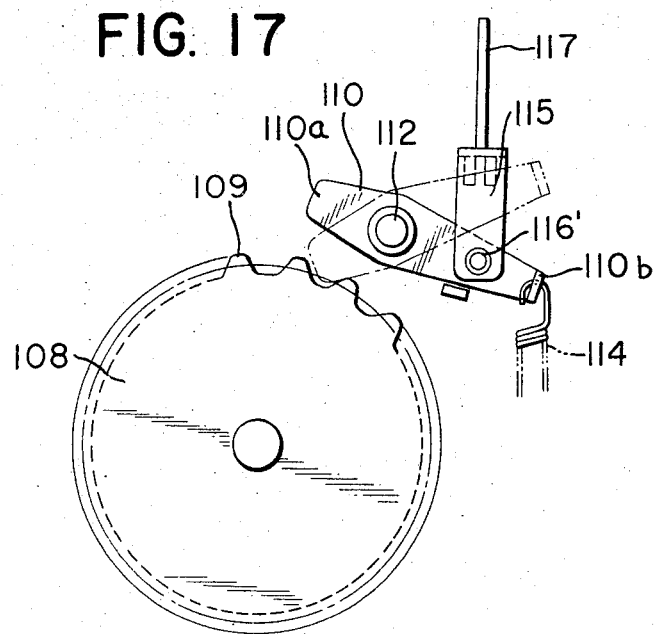
FIG. 17 is a schematic view similar to FIG. 12 but showing the arrangement of parts of a fifth embodiment of the present invention.
Figure 18:
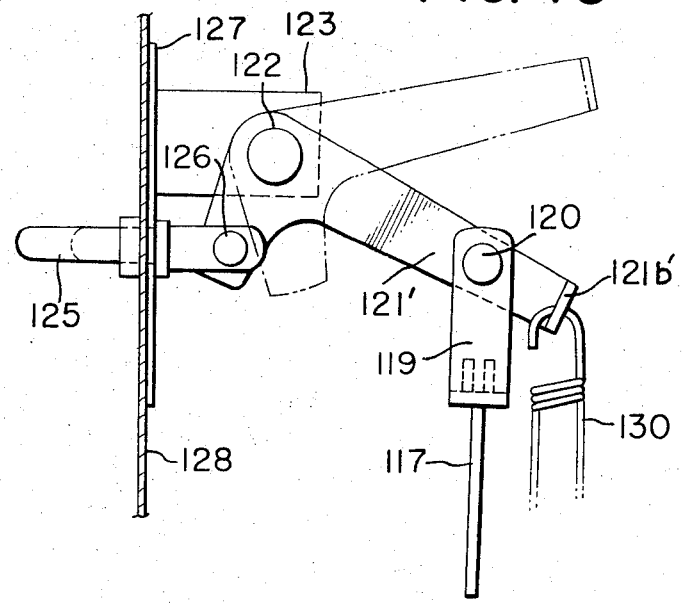
FIG. 18 is a schematic view similar to FIG. 13 but showing the arrangement of parts of the fifth embodiment.

A fifth embodiment of the present invention shown in FIGS. 17 and 18 is another modification of the third embodiment shown in FIGS. 11 to 14. Referring to FIGS. 17 and 18, the coil springs 114 and 130 act to normally bias the lever 110 and bell crank 121' clockwise respectively in lieu of biasing same counter-clockwise. The structure and arrangement of the components of the fifth embodiment are the same as those of the third embodiment except the mounting direction of these springs and the shape of the bell crank 121' to which the cable end 115 is pivoted. Thus, the lever 110 can be automatically engaged with and disengaged from one of the teeth 109 of the locking wheel 108 in response to the closure and opening of the door as in the third embodiment and any detailed description will be unnecessary.

Figure 19:
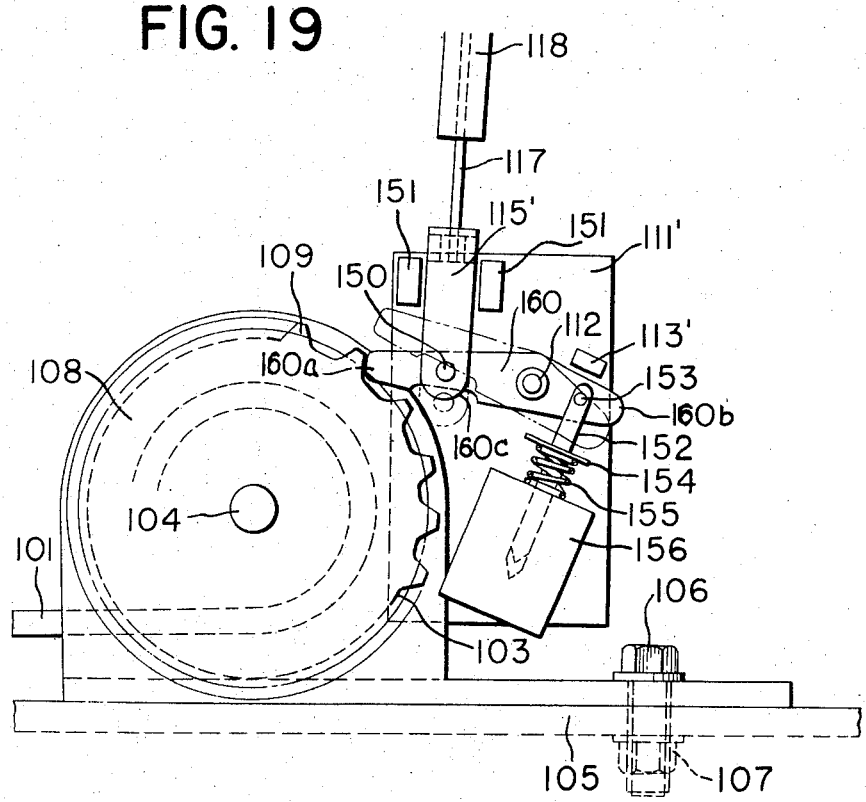
FIG. 19 is a schematic view similar to FIG. 12 but showing the arrangement of parts of a sixth embodiment of the present invention which is obtained by suitably modifying the structure of the embodiments shown in FIGS. 11 to 18 so that the seat belt retractor can be locked in response to the detection of a shock imparted to the vehicle body due to, for example, collision.

FIG. 19 shows a sixth embodiment of the present invention in which the embodiments shown in FIG. 11 to 18 are suitably modified so that the seat belt can be locked in response to the detection of a shock due to, for example, collision although the seat belt is normally maintained in an unlocked state. Principal parts of the sixth embodiment will be described with reference to FIG. 19 which corresponds to FIG. 12 showing the parts of the third embodiment of the present invention. Structure and arrangement of other components are generally similar to those shown in FIGS. 11, 13 and 14 and any detailed description will be unnecessary.

Referring to FIG. 19, a seat belt 101 is anchored at one end thereof to the door of a vehicle, and the other end portion of the seat belt 101 is taken up on a shaft 104 of a seat belt retractor 103 which is mounted to a portion of the body 105 of the vehicle by bolts 106 and nuts 107. A locking wheel 108 having a plurality of teeth 109 is fixedly mounted on the shaft 104 of the retractor 103 having the other end portion of the seat belt 101 wound therearound. A lever 160 having an engaging end portion 160a engageable with the teeth 109 of the locking wheel 108 is pivoted by a pin 112 to a plate 111' welded or otherwise fixed to the retractor 103. The plate 111' is provided with a stopper 113' for limiting counter-clockwise swinging movement of the lever 160. An armature or solenoid pin 152 of a solenoid 156 mounted on the plate 111' is pivoted loosely to the other end portion 160b of the lever 160 by a pin 153. A coil spring 155 is interposed between a backing seat 154 provided on the solenoid pin 152 and the casing of the solenoid 156 for normally biasing the lever 160 counter-clockwise so that the lever 160 takes a position as shown by the solid line in the deenergized state of the solenoid 156. The solenoid 156 is normally energized and the solenoid pin 152 is retracted against the force of the spring 155 so as to maintain the lever 160 in a position as shown by the two-dot chain line. However, in response to the impartation of deceleration of more than a predetermined value to the vehicle body due to, for example, collision, a known detector detects the vehicle body deceleration to interrupt the flow of current being supplied to the solenoid 156 thereby deenergizing the solenoid 156, and as a result, the lever 160 is urged to a position as shown by the solid line by the force of the spring 155. A cable end 115' is provided with a pin 150 at the lower end portion thereof so that the pin 150 is engageable with a recess 160c of the lever 160 and the upper end portion of the cable end 115' is fixed to one end of an inner cable 117. A pair of spaced guide members 151 are provided on the plate 111' so that the cable end 115' is movable in the vertical direction only. The inner cable 117 extends through a hollow tubular outer cable 118.

In the normal state in which usually large deceleration due to, for example, collision is not imparted to the vehicle body, the lever 160 is maintained in the position shown by the two-dot chain line by the solenoid 156 which is in the energized state, and the locking wheel 108 is freely rotatable since the engaging end portion 160a of the lever 160 is not in engagement with one of the teeth 109 of the locking wheel 108.

When deceleration of more than a predetermined value is imparted to the vehicle body due to, for example, collision in the state in which the door is closed, the solenoid 156 is deenergized and the lever 160 is urged from the position shown by the two-dot chain line to the position shown by the solid line by the force of the spring 155 with the result that the engaging end portion 160a of the lever 160 in brought into engagement with one of the teeth 109 of the locking wheel 108 thereby locking the locking wheel 108 against rotation. Thus, the seat belt 101 cannot be drawn out from the retractor 103 any more and binds the passenger to the seat for reliably protecting the passenger from danger.

Then, when the door is opened, the bell crank 121 and another cable end 119 are urged from a position as shown by the two-dot chain line to a position as shown by the solid line in FIG. 14 due to the fact that the force of the spring 155 is greater than the force of the spring 130 (FIG. 14). Therefore, the pin 150 engages with the recess 160c of the lever 160 and is urged upward as the cable end 115' connected to the inner cable 117 is urged upward in FIG. 19 until finally the lever 160 is caused to swing to the position shown by the two-dot chain line. As a result, the engaging end portion 160a of the lever 160 is disengaged from one of the teeth 109 of the locking wheel 108 and the locking wheel 108 is now freely rotatable, thereby permitting drawing out of the seat belt 101 from the retractor 103. Thus, although the passenger is temporarily bound to the seat by the seat belt 101 in the case of collision, this binding is immediately released in response to the opening of the door and the passenger can easily get off the vehicle.

FIGS. 20 and 22 to 24 show a seventh embodiment of the present invention in which an electrical means for energizing a solenoid in response to the sensing of a shock by a sensor is added to the locking means in the embodiments shown in FIGS. 1 to 10 so that the retractor can be normally maintained in an unlocked position and can be placed in a locked position only in the case of emergency. This system is featured by the fact that the solenoid is energized to release the retractor from the locked position only when the engine is in operation and the ignition switch is "on", while the retractor is released from the locked state in response to the opening of the door when the engine is not in operation. This embodiment will now be described with reference to FIGS. 1, 2, 20, 22, 23, and 24.

Referring to FIGS. 1 and 2, the retractor 7 carrying one end portion of the seat belt 6 is mounted in the cut-out portion 4 of the inner panel 3 of the door 2 by the bolt 13. The body of the retractor 7 is generally U-shaped as seen in FIG. 2, and the retracting spring 10 is mounted on one end of the shaft 9 mounted rotatably in the retractor body so as to normally bias the seat belt 6 in the direction in which the seat belt 6 is retracted into the retractor 7.

Figure 20:
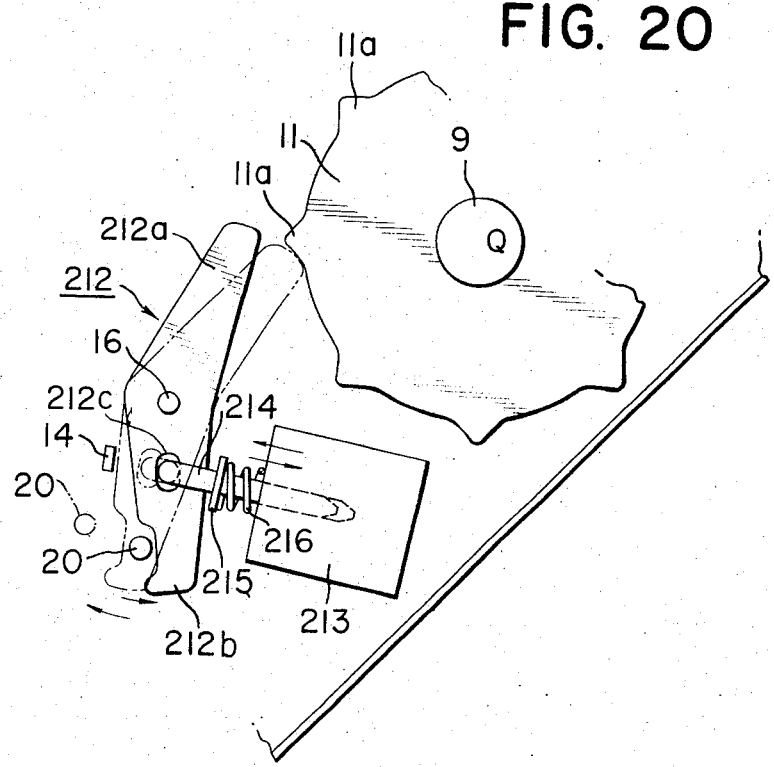
FIG. 20 is a schematic view similar to FIG. 5 but showing the arrangement of parts of a seventh embodiment of the present invention which is obtained by suitably modifying the structure shown in FIGS. 1 to 10 so that the seat belt retractor can be locked in response to the detection of a shock imparted to the vehicle body due to, for example, collision.
Figure 23:
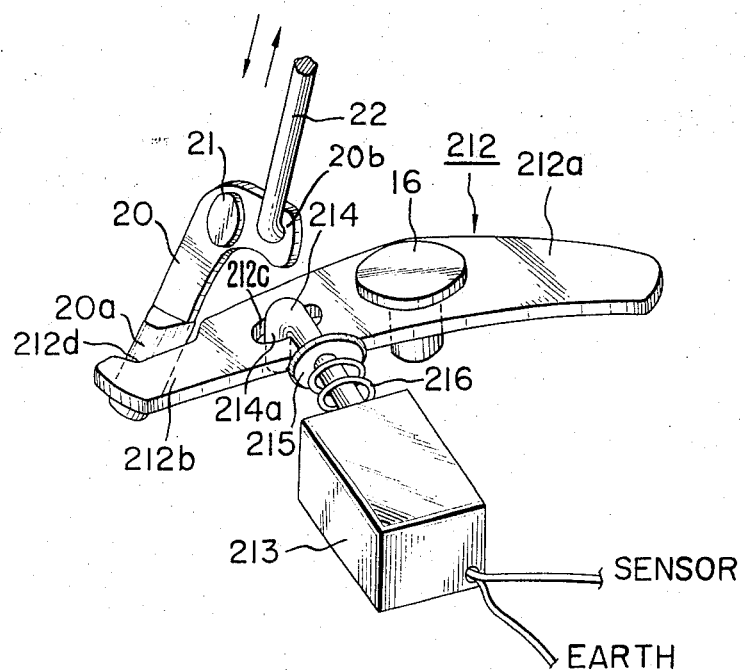
FIG. 23 is a schematic perspective view showing the arrangement of the locking lever and associated elements in FIG. 20.

An automatic locking wheel 11 having a plurality of spaced tooth portions 11a formed on the outer periphery thereof is fixedly mounted on the other end of the shaft 9 as shown in FIG. 20, and a locking lever 212 having an engaging end portion 212a engageable with the tooth portions 11a of the automatic locking wheel 11 is pivoted to the door 2 by a pin 16 so as to make pivotal movement around the pin 16. A solenoid armature or pin 214 axially slidably extending from a solenoid 213 is formed at the outer end thereof with a hook-like engaging portion 214a as best shown in FIG. 23. This hook-like engaging portion 214a engages with a slot 212c bored in a portion adjacent to the other end portion 212b of the locking lever 212. A stopper 14 in FIG. 20 acts to limit the swinging movement of the locking lever 212.

A compression return spring 216 is disposed between a flange 215 secured to the solenoid pin 214 and the casing of the solenoid 213 so as to normally bias the engaging end portion 212a of the locking lever 212 toward the locking wheel 11. In response to the energization of the solenoid 213, the engaging end portion 212a of the locking lever 212 is urged away from the locking wheel 11 by the solenoid 214 against the force of the return spring 216. Therefore, when the solenoid 213 is deenergized, the locking lever 212 is caused to swing clockwise in FIG. 20 by the force of the return spring 216 and the engaging end portion 212a of the locking lever 212 is brought into engagement with one of the tooth portions 11a of the automatic locking wheel 11.

Figure 21:
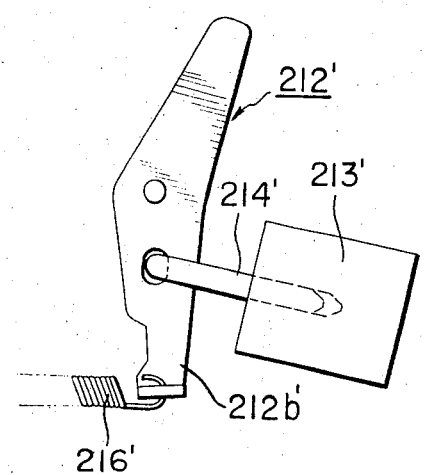
FIG. 21 is a schematic view showing a modification of the locking lever and associated elements shown in FIG. 20.

FIG. 20 shows an arrangement in which the return coil spring 216 216 is mounted on the solenoid pin 214 so as to normally urge the engaging end portion 212a of the locking lever 212 toward one of the tooth portions 11a of the automatic locking wheel 11. In a modified cation as shown in FIG. 21, a tension spring 216' is anchored as one end thereof to one end portion 212b' of a locking lever 212' so as to normally bias the other end portion of the locking lever 212' toward the automatic locking wheel. A solenoid 213' having a solenoid armature or pin 214' is similarly associated with the locking lever 212'.

Figure 22:
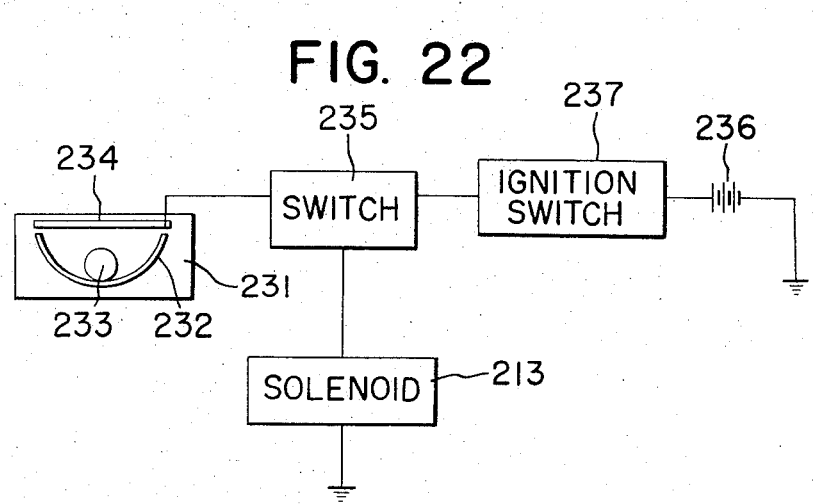
FIG. 22 shows schematically the structure of the sensor actuating the solenoid and also shows electrical connection employed in the embodiment shown in FIG. 20.

The solenoid 213 is energized and deenergized by a circuit as shown in FIG. 22. This circuit includes a sensor 231, a touch switch 235 connected to the solenoid 213, a power supply 236 and an ignition switch 237. The sensor 231 actuates the switch 235 so as to interrupt the flow of current supplied to the solenoid 213 from the power supply 236 through the ignition switch 237. The sensor 231 comprises a hollow semispherical container 232 of electrical insulator, a steel ball 233 placed in the container 232, and a touch plate 234 disposed above the container 232. When the acceleration of gravity of the order of 0.3 to 0.7G is produced due to a shock imparted to the vehicle body, the steel ball 233 contacts the touch plate 234 thereby actuating the touch switch 235 for interupting the supply of current to the solenoid 213. Therefore, when a shock of such a magnitude which will require binding of the passenger to the seat is produced due to collision or for any other reasons, the solenoid 213 is deenergized to cause sliding movement of the solenoid armature or pin 214 to a position as shown by the chain line in FIG. 20 by the force of the spring 216 thereby causing the locking lever 212 to swing to a position as shown by the two-dot chain line and bringing the engaging end portion 212a of the locking lever 212 into engagement with one of the tooth portions 11a of the locking wheel 11 so as to bind the passenger to the seat by the seat belt 6 which is locked against any movement.

FIG. 23 is a perspective view showing the relation between the solenoid 213, the locking lever 212 and a hook-shaped release lever 20. One end portion 20a of the release lever 20 which is pivotal around a pin 21 engages with a groove or recess portion 212d of the locking lever 212, and a rod 22 is connected at one end thereof to the other end portion 20b of the release lever 20 so that the locking lever 212 can make swinging movement around the pin 16 and can be prevented from swinging movement depending on the vertical movement of the rod 22. More precisely, when the rod 22 is urged downward in FIG. 20, that is, when the door 2 is closed as described later, the release lever 20 is urged away from the locking lever 212 as shown by the imaginary line in FIG. 20 so that the locking lever 212 can make swinging movement in response to the deenergization of the solenoid 213. On the other hand, when the rod 22 is urged upward in FIG. 20, the release lever 20 is urged toward the locking lever 212 as shown by the solid line in FIG. 20 so that the locking lever 212 cannot make swinging movement even when it is biased in the swinging direction by the force of the spring 216 in the deenergized state of the solenoid 213. Further, even when the locking lever 212 is in the position shown by the two-dot chain line in FIG. 20 due to the deenergization of the solenoid 213, the locking lever 212 can be caused to swing to the position shown by the solid line by urging the rod 22 upward. The solenoid 213 in FIG. 23 is shown connected across the sensor and ground.

Figure 24:
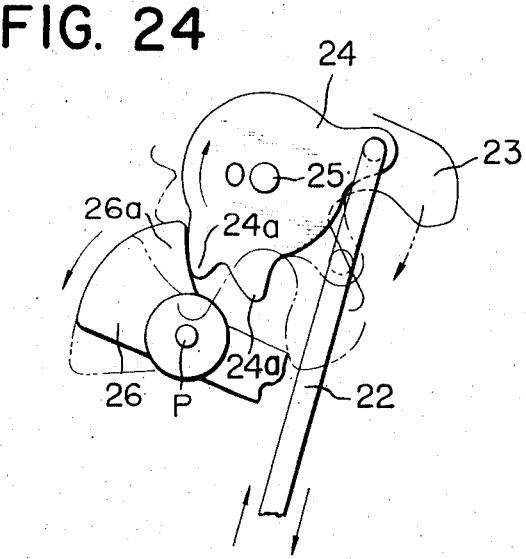
FIG. 24 is a schematic view showing the arrangement of the ratchet wheel and associated elements in the seventh embodiment.

Referring to FIG. 24 showing door locking means, a ratchet wheel 24 to which the other end of the rod 22 is connected is rotatable around the axis O of a pin 25 and is mounted for unitary rotation with a locking wheel 23 which is engageable with a striker (not shown) mounted on the vehicle body. Further, a spring (not shown) is associated with the ratchet wheel 24 for normally biasing the ratchet wheel 24 in a direction in which the locking wheel 23 is unlocked from the engaging position from the striker, hence in a direction in which the rod 22 is urged upward. The ratchet wheel 24 is provided with a plurality of spaced tooth portions 24a. A ratchet lever 26 having a tooth portion 26a is pivotal around a pin P and is normally biased by a spring (not shown) so that the tooth portion 26a can be normally engaged by one of the tooth portions 24a of the ratchet wheel 24. In response to the closure of the door 2, therefore, the striker on the vehicle body engages with the locking wheel 23 and the locking wheel 23 is rotated clockwise together with the ratchet wheel 24. In this case, the slide contact surface portion of the tooth portion 24a of the ratchet wheel 24 in contact with the slide contact surface portion of the tooth portion 26a of the ratchet lever 26 urges the ratchet lever 26 to swing counter-clockwise and the rod 22 is urged downward for causing clockwise swinging movement of the release lever 20 in FIG. 20. Due to the fact the biasing springs (not shown) are provided for the ratchet wheel 24 and ratchet lever 26 respectively, the engaging surface portion of the tooth portion 26a of the ratchet lever 26 is finally brought into engagement with the engaging surface portion of the tooth portion 24a of the ratchet wheel 24 to maintain the door 2 in the closed position. Then, when the door 2 is opened, a lever (not shown) acts to urge the ratchet lever 26 counter-clockwise against the force of the biasing spring with the result that the tooth portion 26a of the ratchet lever 26 is disengaged from the tooth portion 24a of the ratchet wheel 24 and the force tending to open the door 2 is imparted to release the engagement between the locking wheel 23 and the striker. In this case, the rod 22 is urged upward and the release lever 20 is caused to swing counter-clockwise in FIG. 20.

Figure 25:
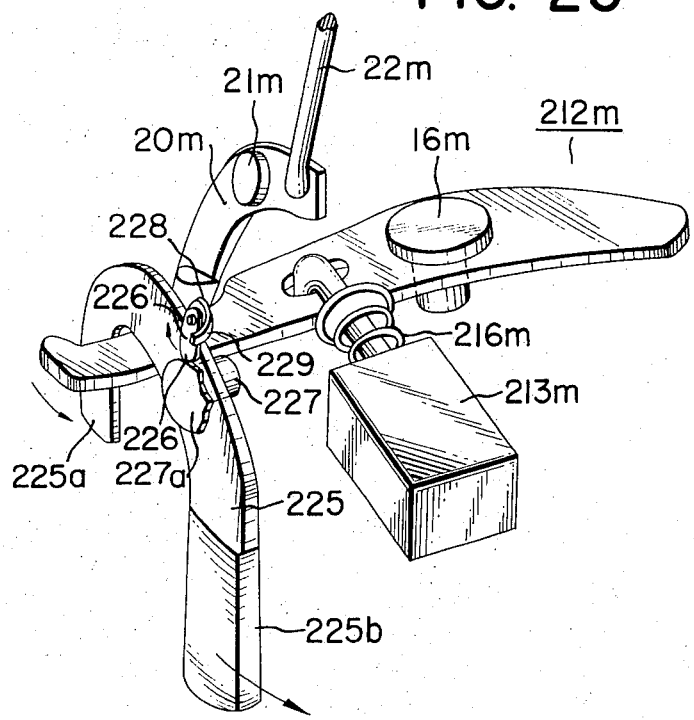
FIG. 25 is a schematic perspective view similar to FIG. 23 but showing a partial modification of the seventh embodiment.

FIG. 25 is a perspective view of another embodiment in which an emergency lever 225 is associated with a locking lever 212m one end portion of which is engageable with a tooth portion of an automatic locking wheel. The emergency lever 225 engages at one end portion 225a thereof with a cut-out formed at the other end portion of the locking lever 212m. The emergency lever 225 has an inverted U-shape and is pivotal around a pin 227. When the passenger pulls by his hand the other end portion 225b of the emergency lever 225 in a direction as shown by the arrow, the emergency lever 225 swings around the pin 227 and the engagement between the engaging end portion of the lever 212m and the tooth portion of the automatic locking wheel is released for releasing the seat belt from the state locked by the retractor. The pin 227 is provided with a flange 227a having a serrated portion which is engaged by a one-way lever 226 pivotally mounted on a pin 228 secured to an upper part of a bracket 229. The one-way lever 226 swings clockwise as shown by the arrow only when the lever 225 is pulled in the direction shown by the arrow since counter-clockwise movement of the lever 226 is restricted by a stopper provided on the bracket 229. The one-way lever 226 engages with the serrated portion of the pin 227 thereby preventing the lever 225 from moving toward the original position.

In the locking device for the seat belt retractor for vehicles above described. the seat belt is locked when the door is closed in the state in which the engine is not in operation. This is due to the fact that no current is supplied to the solenoid 213 and the solenoid 213 is not energized. In the closed position of the door, the striker on the side of the vehicle body 1 engages with the locking wheel 23 on the side of the door 2 and the ratchet wheel 24 is rotated clockwise as shown by the arrow. The rod 22 is urged downward and the release lever 20 is caused to swing to the position shown by the imaginary chain line in FIG. 23, with the result that the force of the spring 216 only is imparted to the lever 212 and the lever 212 is biased to the position shown by the two-dot chain line in FIG. 20 to lock the seat belt 6.

Then, when the door 2 is opened in the state in which the engine is not in operation, the seat belt 6 can be freely supplied from and retracted into the retractor 7. In this case too, the solenoid 213 is not energized as in the above case. However, in response to the opening of the door 2, the engagement between the striker and the locking wheel 23 is released and the rod 22 is urged upward with the result that the release lever 20 is biased to the position shown by the solid line in FIG. 20 against the force of the spring 216 and the lever 212 is biased to the position shown by the solid line in FIG.

20. Therefore, the automatic locking wheel 11 is disengaged from the locking lever 212 and the seat belt 6 can be freely supplied from and retracted into the retractor 7.

When the engine is started and the ignition switch is turned on, the seat belt 6 can be freely supplied from and retracted into the retractor 7 even when the door 2 is kept closed. In the closed position of the door 2 in such a state, the release lever 20 takes the position shown by the imaginary line in FIG. 20. But, due to the fact that the solenoid 213 is now energized, the solenoid pin 214 is retracted into the solenoid 213 against the force of the spring 216. Therefore, in the normal state in which the engine is in operation, the solenoid 213 is always in the energized state and the automatic locking wheel 11 is not engaged by the locking lever 212 so that the seat belt 6 can be freely supplied from and retracted into the retractor 7.

When the acceleration of gravity of the order of 0.3G to 0.7G occurs during driving of the vehicle or when an unusual condition occurs in the wiring system, the seat belt 6 is locked against any movement. More precisely, the sensor 231 detects the deceleration of the predetermined value and acts to turn off the touch switch 235 thereby interrupting the supply of current to the solenoid 213. Since the door 2 is in the closed position, the force of the spring 216 is solely imparted to the locking lever 212 which is therefore biased to the position shown by the two-dot chain line in FIG. 20, and the seat belt 6 is locked to bind the body of the passenger to the seat. If the retractor 7 were not placed in the freely rotatable state for some reasons, the passenger may pull the emergency lever 225 in the direction shown by the arrow in FIG. 25. The lever 225 swings around the pin 227 to cause counter-clockwise swinging movement of the locking lever 212m thereby disengaging the locking lever 212m from the automatic locking wheel 11 and causing clockwise swinging movement of the one-way lever 226 so as to bring the one-way lever 226 into engagement with the serrated portion of the flange 227a secured to the pin 227. After the lever 225 is pulled in the direction shown by the arrow, the lever 225 is fixed in that position by the one-way lever 226 engaging with the serrated portion of the flange 227a secured to the pin 227.

The locking device for the seat belt retractor having the structure above described is advantageous in that the length of the seat belt can be freely selected by the passenger in the vehicle and the power of the battery is not wastefully consumed due to the fact that the solenoid is connected to the battery through the ignition switch. When the vehicle is not running, the seat belt can be easily supplied from and retracted into the retractor in response to the opening and closure of the door. Further, the provision of the emergency lever is advantageous in that the seat belt can be reliably released from the position locked by the retractor in case of emergency.

What is claimed is:

1. A locking device for a seat belt releasably binding the body of the passenger to the seat in a vehicle having a striker mounted on the vehicle body comprising a seat belt retractor for releasably holding one end portion of said seat belt, said seat belt retractor including a shaft hving a retracting direction, an automatic locking wheel having a plurality of tooth portions and mounted firmly on said shaft, a locking lever pivoted at substantially the central portion thereof to the door by a pin and having an engaging end portion engageable with said tooth portions of said automatic locking wheel, a return spring associated with said locking lever for normally biasing said engaging end portion of said locking lever toward said automatic locking wheel, a release lever engageable at one end portion thereof with the other end portion of said locking lever, a ratchet wheel rotatable in unitary relation with a latch wheel engageable with the striker mounted on the vehicle body, and a rod connecting the other end portion of said release lever to a portion of said ratchet wheel.

2. A locking device for a seat belt as in claim 1 and comprising a solenoid including an armature engaging said other end portion of said locking lever to retain said locking lever in a predetermined released position under normal operating conditions.

3. A locking device as in claim 2 where power means connect to said solenoid and said power means include a gravity actuated sensor to change power supply to said solenoid when said sensor is actuated to operatively move said locking lever to position its said engaging end portion in engagement with said tooth portion of said automatic locking wheel and prevent movement of the seat belt.

4. A locking device as in claim 1 including a pivotal emergency release lever operatively engaging the other end portion of said locking lever to move said locking lever to a release position when said emergency release lever is actuated.

5. A locking device as in claim 1 where the device is mounted in a vehicle door having an inside door handle, an open lever operatively connects to the said ratchet wheel, and means connect said open lever to said inside door handle to move said ratchet wheel and said rod to release said locking lever upon movement of said inside door handle to a door open position.

* * * * *